(12) United States Patent
Matsuda (10) Patent No.: US 8,243,302 B2
(45) Date of Patent: Aug. 14, 2012

(54) IMAGE TRANSMISSION APPARATUS AND METHOD

(75) Inventor: Hideyuki Matsuda, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 2265 days.

(21) Appl. No.: 10/984,883

(22) Filed: Nov. 10, 2004

(65) Prior Publication Data

US 2005/0231757 A1 Oct. 20, 2005

(30) Foreign Application Priority Data

Apr. 16, 2004 (JP) ................................ 2004-122083

(51) Int. Cl.
*G06F 3/12* (2006.01)
*G06F 15/16* (2006.01)
(52) U.S. Cl. .................... 358/1.15; 709/204; 709/206
(58) Field of Classification Search .................. None
See application file for complete search history.

(56) References Cited

U.S. PATENT DOCUMENTS

| | | | | |
|---|---|---|---|---|
| 7,209,263 | B2 * | 4/2007 | Takayama | 358/402 |
| 7,243,128 | B2 * | 7/2007 | Tanimoto | 709/206 |
| 7,801,979 | B2 * | 9/2010 | Matsumoto | 709/224 |
| 2001/0017712 | A1 | 8/2001 | Kasatani | |
| 2002/0019848 | A1 * | 2/2002 | Sugawara et al. | 709/206 |
| 2002/0077081 | A1 * | 6/2002 | Kido | 455/412 |
| 2003/0200270 | A1 * | 10/2003 | Tanimoto | 709/206 |

FOREIGN PATENT DOCUMENTS

| | | |
|---|---|---|
| JP | 8-331289 | 12/1996 |
| JP | 9-181873 | 7/1997 |
| JP | 2000-59553 | 2/2000 |
| JP | 2001-306446 | 11/2001 |
| JP | 2003-46706 | 2/2003 |
| JP | 2003-186810 | 7/2003 |

OTHER PUBLICATIONS

Japanese Office Action dated Mar. 7, 2006.

* cited by examiner

*Primary Examiner* — Twyler Haskins
*Assistant Examiner* — Marcus T Riley
(74) *Attorney, Agent, or Firm* — Buchanan Ingersoll & Rooney PC (57) ABSTRACT

An improved image transmission apparatus capable of reducing the amount of work involved in the checking and transmission operations performed by the user at the time of image data transmission, the apparatus including an address accept unit that accepts input of a first address and a second address, a reader that reads an original document to obtain data pertaining thereto, a first transmission unit that sends original document data obtained by the reader to the first address, a receiving unit that receives a reply from the first address responding to the transmission by the first transmission unit, and a second transmission unit that sends the original document data to the second address when the receiving unit receives from the first address a reply indicating acceptability of the original document data.

15 Claims, 9 Drawing Sheets

Management table

| Job ID | Date and time | User 1 | User 2 | Attached file name |
|---|---|---|---|---|
| 2001 | 20030925:1029 | aaa@xxxx.jp | bbb@yyyy.jp | Bill.jpg |
| 2002 | 20031001:2158 | xxx@xxxx.jp | ppp@yyyy.jp | Image.pdf |
| 2003 | 20031015:1746 | yyy@xxxx.jp | abc@pqr.co.jp | Map1.tif |
| ... | ...... | ...... | ...... | ...... |

| Job ID | Date and time | User 2 | Attached file name | Transmission results |
|---|---|---|---|---|
| 2001 | 20030925:1059 | bbb@yyyy.jp | Bill.jpg | OK |
| ⋮ | ⋮ | ⋮ | ⋮ | ⋮ |

Fig. 9

IMAGE TRANSMISSION APPARATUS AND METHOD

This application is based on Japanese Patent Application No. 2004-122083 filed in Japan on Apr. 16, 2004, the entire content of which is hereby incorporated by reference.

BACKGROUND OF THE INVENTION

1. Field of the Invention

The present invention relates to an image transmission technology, and more particularly, to an image transmission apparatus and method that can externally send data obtained via reading of an original document.

2. Description of Related Art

Apparatuses that incorporate a scanner that reads original documents, such as MFPs (multifunction peripherals), are known, and transmission of electronic data obtained from scanning of an original document using an MFP is carried out in the conventional art. When this is done, in order to check whether or not the reading of the original document was performed normally (i.e., whether small letters are accurately distinguished, whether the original document is oriented in the correct direction after it is read, etc.), the user often sends the obtained electronic data to his own PC (personal computer), and then sends the data via e-mail or FTP (file transfer protocol) to the recipient after confirming on his PC that the data is acceptable.

In addition, in order to check the quality of the read image, the user may print the data immediately after the original image is read by the MFP or display it on a nearby display.

For example, Japanese Laid-Open Patent Application H8-331289 discloses a facsimile machine that prints document data obtained via scanning, and then transmits such data if it is confirmed to be acceptable.

Japanese Laid-Open Patent Applications 2000-59553 and H9-181873 respectively disclose an image input device and a facsimile system that cause a specified display to display the document data obtained via scanning using various methods to enable the data quality to be checked.

OBJECT AND SUMMARY

An object of the present invention is to provide an improved image transmission apparatus and method that resolve the problems identified above.

Another object of the present invention is to provide an image transmission apparatus and method that can reduce the amount of work involved in the checking and transmission operations performed by the user at the time of image data transmission.

These and other objects are attained by providing an image transmission apparatus including:

An address accepting unit that accepts input of a first address and a second address;

a reader that reads the original document to obtain the data pertaining thereto;

a first transmission unit that sends the original document data obtained by the reader to the first address;

a receiving unit that receives a reply from the first address responding to the transmission by the first transmission unit; and a second transmission unit that sends the original document data to the second address when the receiving unit receives from the first address a reply indicating the acceptability of the original document data.

BRIEF DESCRIPTION OF THE DRAWINGS

These and other objects and features of the present invention will become clear from the following description taken in conjunction with the preferred embodiments thereof with reference to the accompanying drawings, in which:

FIG. 6 is a flow chart showing the operations performed by the MFP 100 and the PC 300a;

DETAILED DESCRIPTION OF THE PREFERRED EMBODIMENTS

First Embodiment

Figure 1:
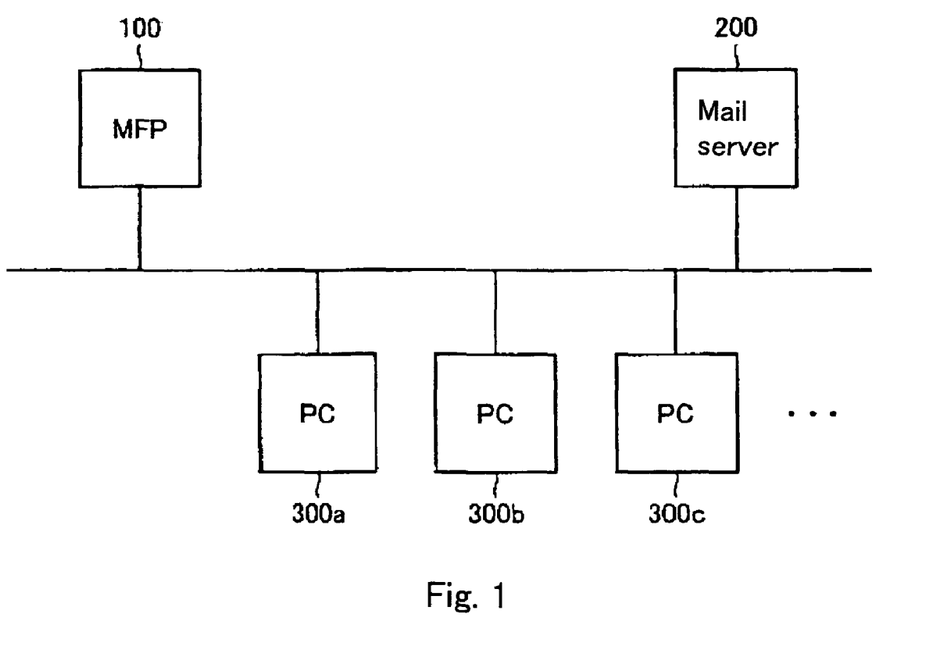
FIG. 1 is a block diagram showing the construction of the image transmission system pertaining to a first embodiment of the present invention.

FIG. 1 is a block diagram showing the construction of an image transmission system including the image transmission apparatus of a first embodiment of the present invention.

With reference to the drawing, the image transmission system comprises an MFP 100 serving as an image transmission apparatus, a mail server 200 and user PCs 300a-300c that are respectively connected to the network.

Original document data read by the MFP 100 is sent to the PC of the user who instructed the reading operation (i.e., the PC 300a here). When a check completed notification is sent from the PC 300a to the MFP 100 after the user has checked the read original document data using the PC 300a, the MFP 100 sends the read original document data to the PC (the PC 300b here) of the intended recipient of the data, which was entered at the time of reading of the original document.

Figure 2:
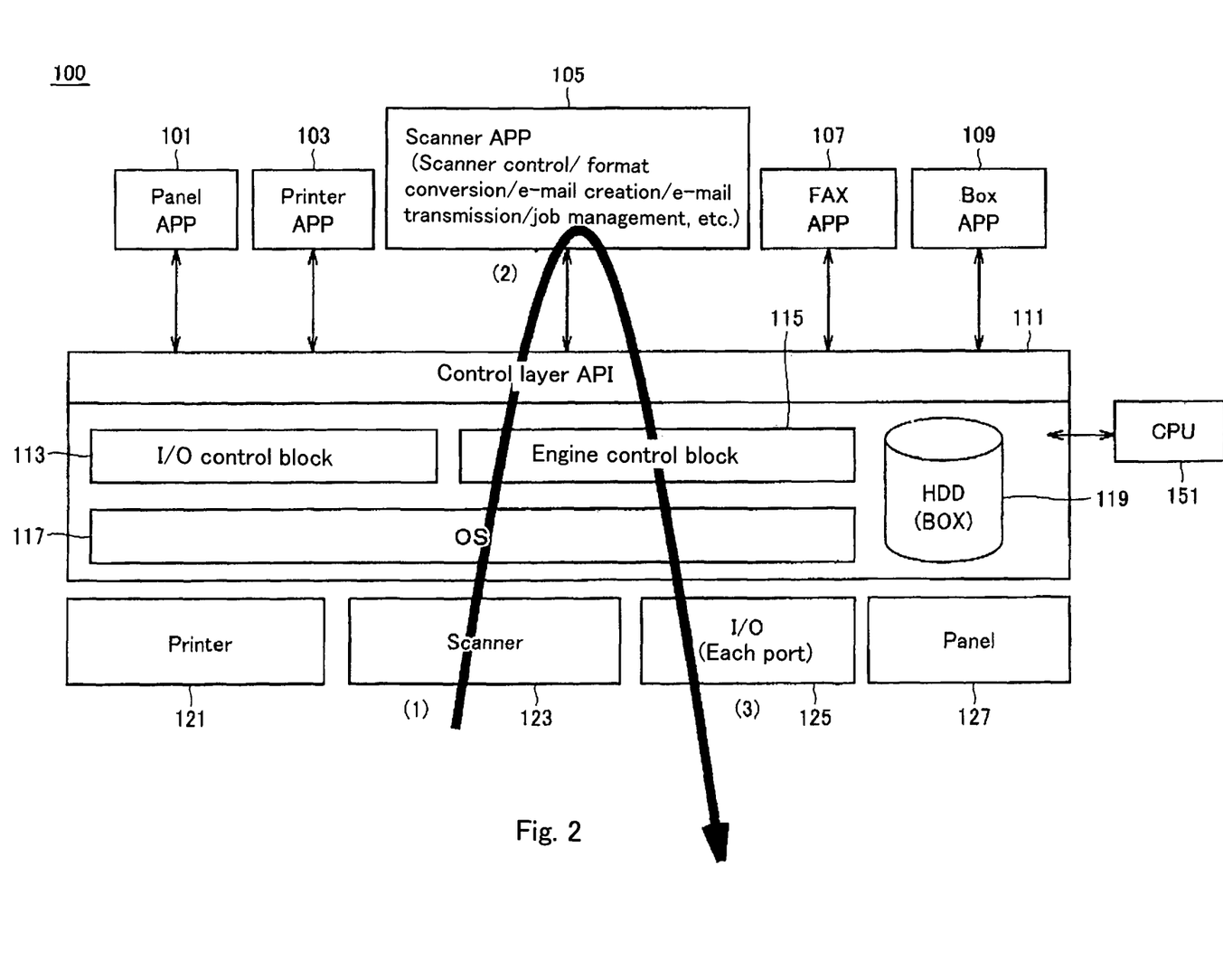
FIG. 2 is a block diagram showing the construction of the MFP 100 shown in FIG. 1.

FIG. 2 is a block diagram showing the construction of the MFP 100 shown in FIG. 1. The MFP 100 is a multifunction peripheral including such functions as a scanner function, a copier function, a facsimile function and a printer function.

With reference to the drawing, the MFP 100 has an panel application 101 to control the operation panel, a printer application 103 for printer control, a scanner application 105 for scanner control, a CPU 151 that executes these applications and performs various types of processing, a facsimile application 107 for facsimile transmission/reception, and a box application 109 for the control of the box (hard disk drive) in which image data is stored.

The scanner application 105 is a software program to execute such processing operations as scanner control, format conversion, e-mail creation and transmission and job management. The scanner application comprises a transmission unit 105c. The transmission unit 105c may operate as both a first transmission unit 105a for sending original document data obtained by a scanner 123 to a first address as discussed below, and a second transmission unit 105b for sending the original document data to a second address as discussed below.

The MFP 100 includes a control layer API (application program interface) 111, an I/O control block 113, an engine control block 115, an OS (operating system) 117 and a hard disk drive (box) 119.

The MFP 100 also has a printer 121 comprising hardware and the scanner 123 comprising reading means, as well as an I/O 125 and an operation panel 127.

When an original document is read by the scanner 123 (operation (1) in FIG. 2), the read data is sent to the scanner application 105, wherein scan data format conversion and e-mail creation and transmission are carried out (operation (2)). The data is subsequently sent externally via the I/O 125 (operation (3)). The arrow in FIG. 2 indicates such flow of the data.

Figure 3:
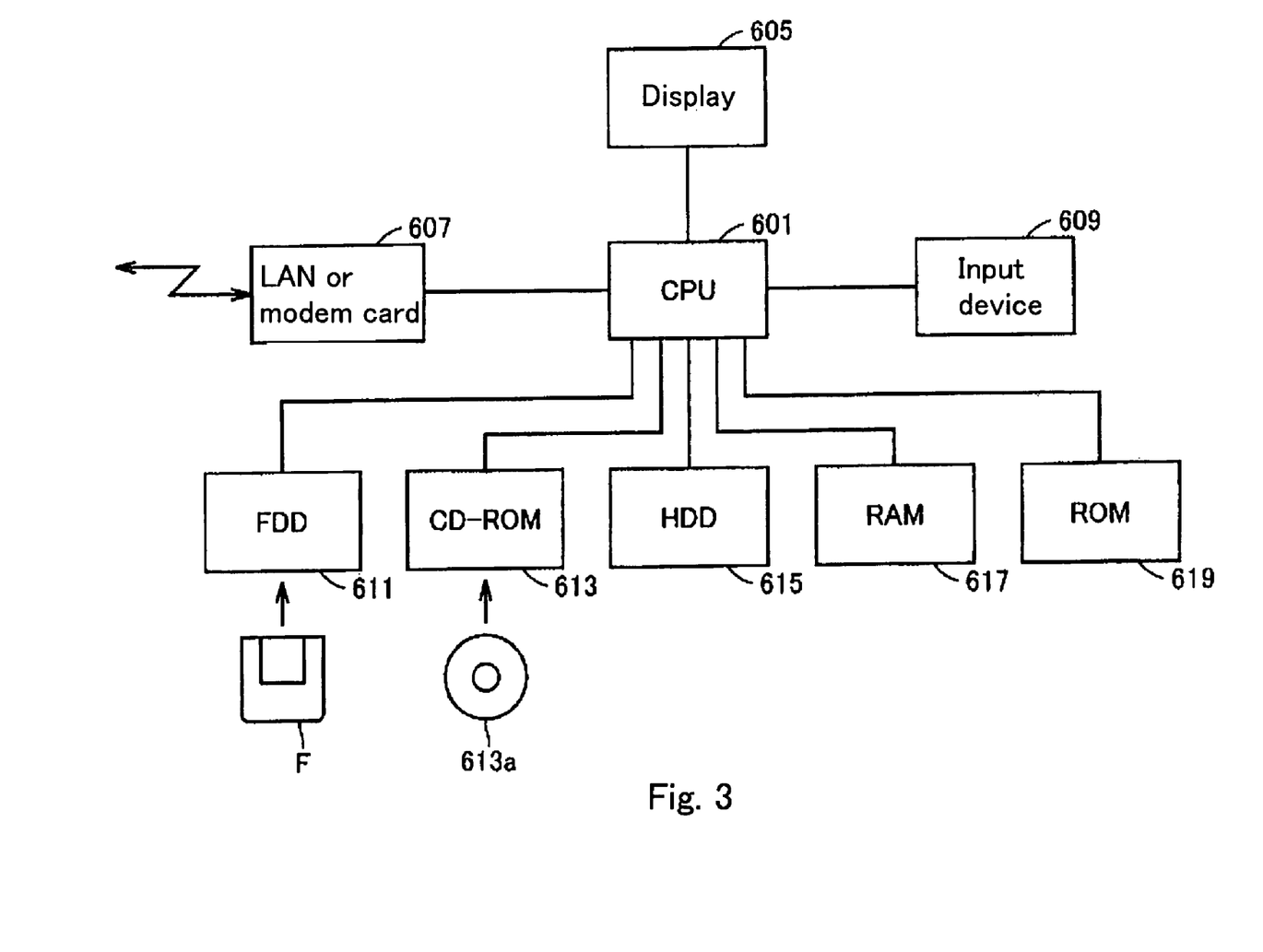
FIG. 3 is a block diagram showing the construction of one of the PCs 300a-300c or the mail server 200 shown in FIG. 1.

FIG. 3 is a block diagram showing the construction of one of the PCs 300a-300c or the mail server 200. These comprise ordinary personal computers, and are assumed to each have an identical construction in this embodiment.

With reference to the drawing, the PC (or the mail server) includes a CPU 601 that performs overall control of the apparatus, a display 605, a LAN (local area network) card (or modem card) 607 for connection to a network or communication with external devices, an input device 609 comprising a keyboard and mouse or the like, a flexible disk drive 611, a CD-ROM drive 613, a hard disk drive 615, a RAM 617 and a ROM 619.

Data such as a program recorded on a flexible disk F can be read via the flexible disk drive 611, and data such as a program recorded on a CD-ROM 613a can be read via the CD-ROM drive 613.

Figure 4:
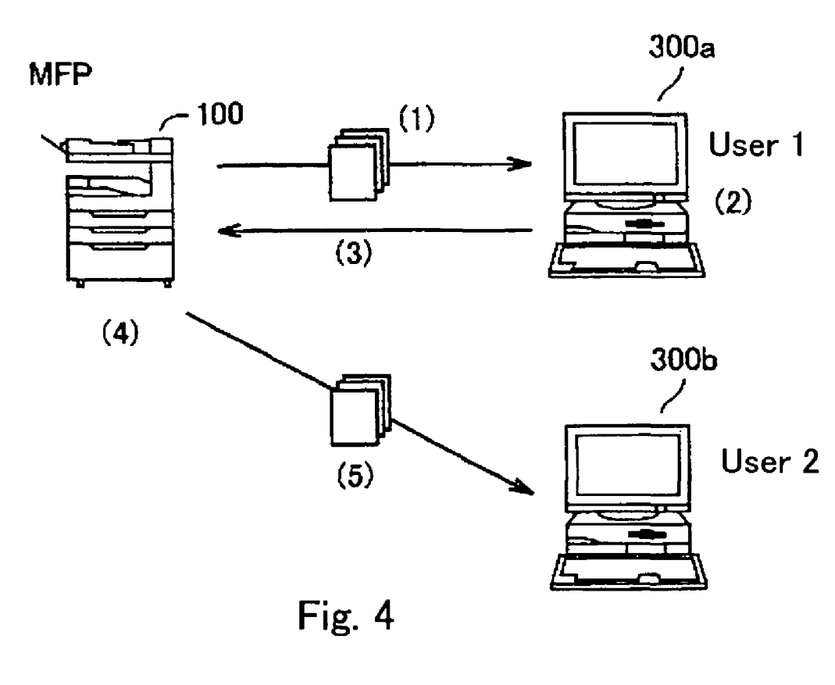
FIG. 4 is a drawing to explain the operations performed by the MFP 100 and the PCs 300a and 300b of the first embodiment.

FIG. 4 is a drawing to explain the operations performed by the MFP 100 and the PCs 300a and 300b in this embodiment.

An example in which a user 1 wishes to send image data obtained via scanning using the MFP 100 to a user 2 after checking the acceptability of the data on his own PC 300a will be described in this embodiment.

The user 1 first goes to the location of the MFP 100 and enters the address of the user 2's PC 300b as the transmission recipient via selection or typing. Here, the method of transmission can be e-mail, FTP, SMB or the like. The user 1 then enters via selection or typing the e-mail address of his PC 300a as the address of the person who will check the electronic data (the checker). He then selects the scan mode and presses the start key to start the reading of the original document.

The scanned image data is ultimately sent to the user 2's PC 300b via the following sequence.

(1) The MFP sends the image data to the user 1's PC 300a as an attached file to an e-mail. When this is done, the job ID is entered in the e-mail's 'Subject' section as identification information for the job (step (1) in FIG. 4). The MFP also temporarily stores the transmission contents and the image data in its internal RAM (or other storage device such as the hard disk), and puts the job on hold.

(2) The user 1 checks the image data received on the PC 300a (2).

(3) If the image data is acceptable, the user 1 sends an e-mail reply to the MFP (3).

(4) When a reply e-mail is received, the MFP specifies a job stored in the internal RAM based on the job ID entered in the 'Subject' section of the e-mail and re-opens the job (4).

(5) The MFP starts data transmission via the designated transmission means (e-mail, FTP or SMB) to the user 2's PC 300b using the transmission contents and image data stored in the internal RAM and specified by the job ID (5).

Figure 5:
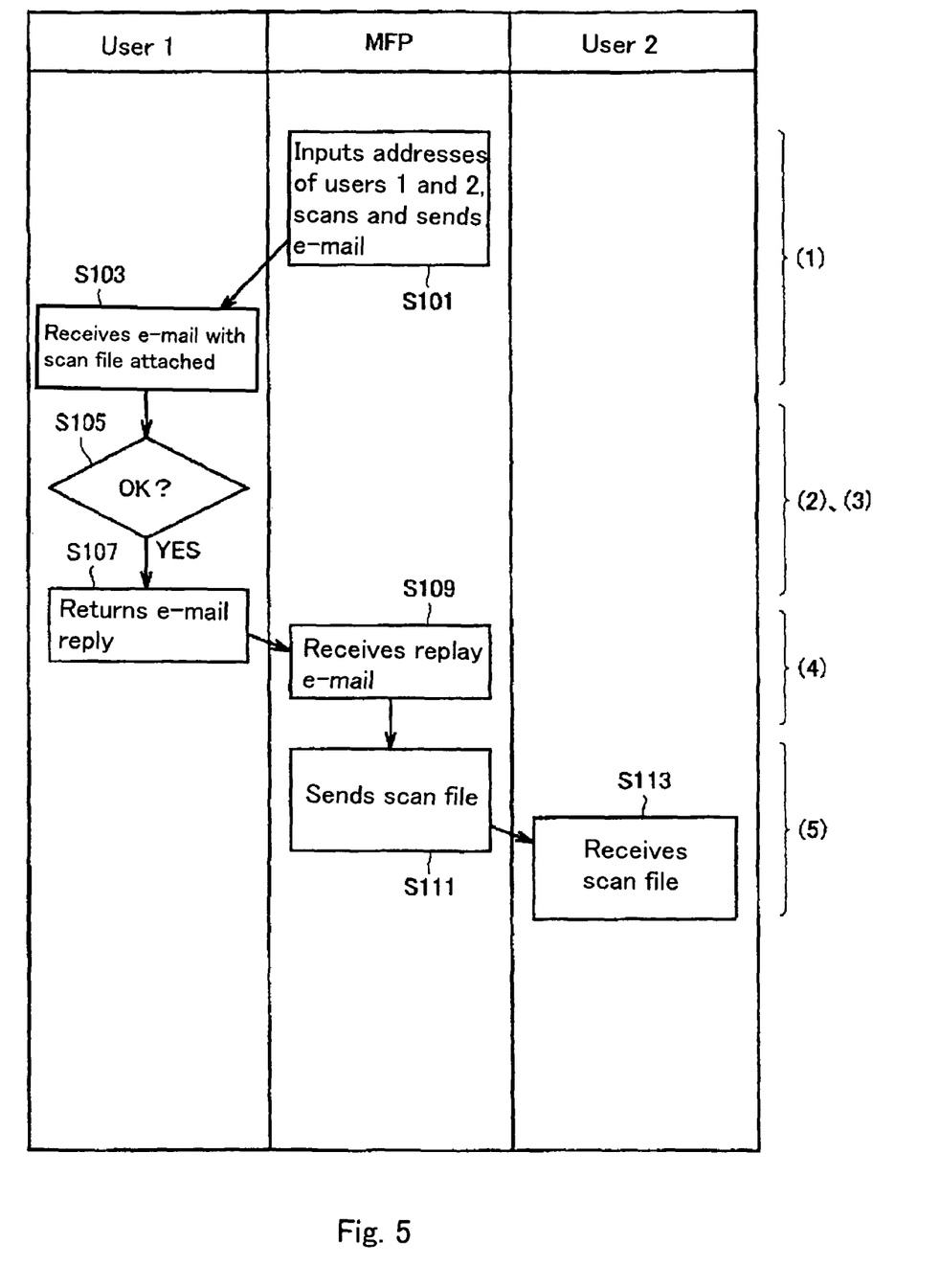
FIG. 5 is a flow chart that chronologically explains the operations performed in the image transmission system.

FIG. 5 is a flow chart that chronologically explains the operations performed in the image transmission system.

The numbers (1)-(5) assigned at the right hand side of each icon in the drawing indicate that the icon corresponds to the operations (1)-(5) shown in FIG. 4.

With reference to FIG. 5, the PC addresses of the user 1 (sender user) and the user 2 (recipient user) are entered in the MFP in step S101. The original document is scanned, and the data obtained as a result thereof is attached to an e-mail, and is first sent to the user 1's PC.

The e-mail to which the scan file is attached is received by the user 1's PC in step S103. If the file is deemed acceptable after it is checked by the user 1 (S105), a reply e-mail is sent to the MFP in step S107.

If the MFP receives a reply e-mail in step S109, the same scan file is sent to the user 2, i.e., the intended recipient, in step S111. The scan file is received by the user 2's PC in step S113.

Figure 6:
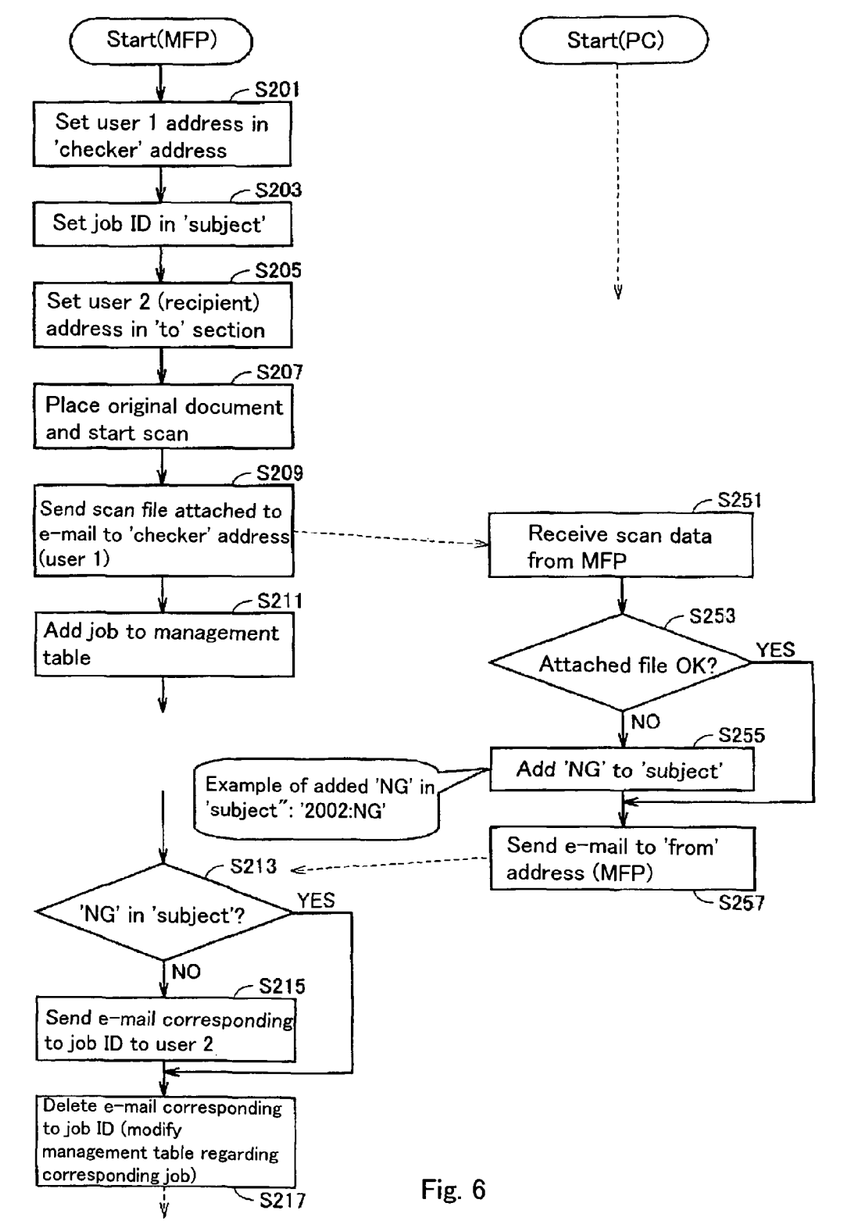

FIG. 6 is a flow chart showing the operations performed by the MFP 100 and the PC 300a. These operations are executed by the CPUs of the MFP 100 and the PC 300a in accordance to the control programs installed in each apparatus (in the case of the MFP 100, the scanner application 105 shown in FIG. 2).

In step S201, the user 1 enters the address of his PC 300a as the checker address using the operation panel 127 of the MFP.

In step S203, the job ID is entered in the 'Subject' section of the e-mail. This job ID may be automatically generated by the MFP and entered, or the user 1 may enter it manually.

In step S205, the user 1 enters the address of the user 2's PC 300b, i.e., the recipient, in the 'To' section that indicates the e-mail recipient.

In step S207, the original document is placed in the MFP 100 and scanning is begun. In step S209, an e-mail to which the scan file is attached is sent to the checker address (i.e., the address of the user 1's PC 300a).

In step S211, the read original document data is added to the management table (see FIG. 7) as a job.

Where the PC 300a receives the e-mail with attached scan data in step S251 following the e-mail transmission in step S209, the user 1 displays the image on the display 605 (see FIG. 3), for example, to check the attached file, and determines in step S253 whether the data is acceptable. If the data is not acceptable, the user 1 adds NG in the e-mail 'Subject' section, and sends the e-mail (reply e-mail) to the 'From' address of the received e-mail (the MFP address) in step S257. Where the job ID is '2002' and the 'Subject' section of the received e-mail indicates '2002', for example, the reply e-mail 'Subject' section shows '2002: NG' (or 'Re: 2002:NG' or the like) if the received data is not acceptable.

On the other hand, if the attached file is acceptable (YES in S253), a reply e-mail is sent in step S257 without any additions to the 'Subject' section.

When the MFP receives the e-mail in step S213, it is determined whether 'NG' is included in the 'Subject' section of the e-mail, and if the answer is NO, an e-mail to which the file corresponding to the job ID shown in the 'Subject' section is sent to the address of the user 2's PC 300b in step S215.

In step S217, the file and e-mails associated with the job ID are deleted in step S217, and the corresponding job information in the management table is modified.

If the answer is YES in step S213, the CPU of the MFP proceeds to step S217 without carrying out transmission to the user 2, and deletes the associated file and e-mails.

Figure 7:
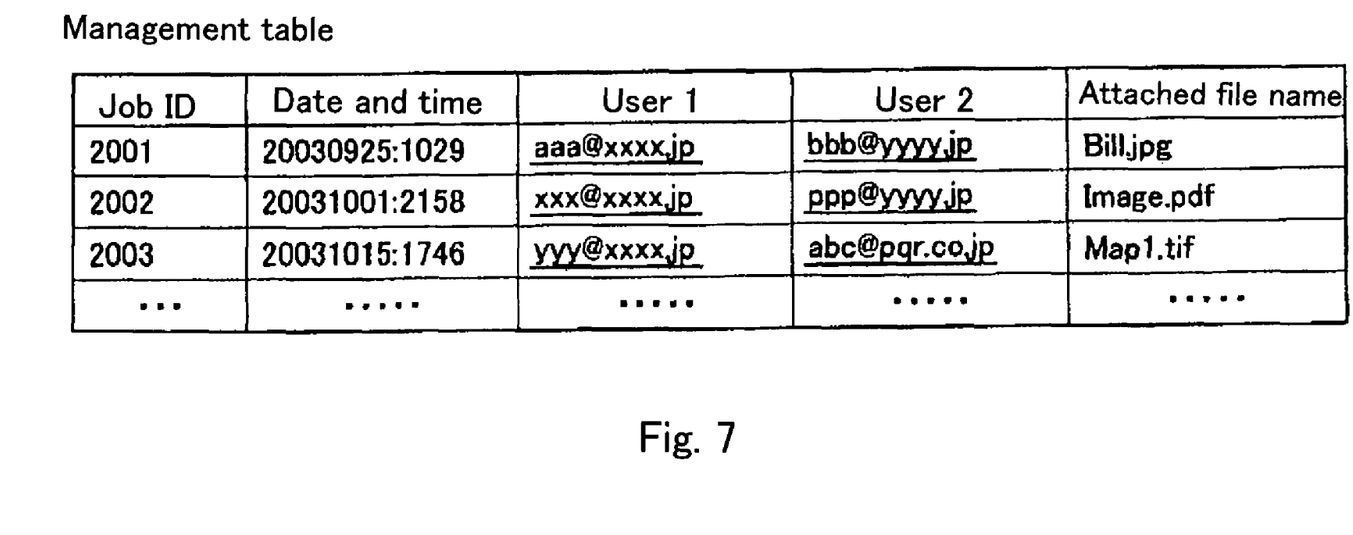
FIG. 7 shows a job management table recorded in the MFP.

FIG. 7 shows the job management table recorded in the MFP. Such management table is stored on a storage device such as the hard disk 119 of the MFP (see FIG. 2).

With reference to the drawing, the date and time of registration of the job, the user 1's (the checker's) PC address, the user 2's (the recipient's) PC address and the attached file name (scan file name) are recorded for each job ID.

Transmission of original document data to the users 1 and 2 can be managed using this table.

The image data (scan file) attached to an e-mail for checking by the checker may comprise image data for one page only or image data for all pages. It is also acceptable if the user can select either a one-page image or an all-pages image.

As described above, according to this embodiment, the MFP sends the checker an e-mail to which image data is attached, and by specifying the job ID from the reply e-mail, it starts transmission of data to the intended recipient. Accordingly, the operations involved in checking the image data read by an MFP or the like and then sending such image data to the intended recipient from the MFP can be made easier.

Second Embodiment

Because the construction of the image transmission system pertaining to a second embodiment of the present invention is the same as that of the system pertaining to the first embodiment, explanation thereof will not be repeated herein.

The operations performed by the MFP 100 and the PCs 300a and 300b in this embodiment will be explained with reference to FIG. 4.

(1) The MFP attaches the image data to an e-mail and sends it to the user 1's PC 300a (operation (1) in FIG. 4). When this is done, the MFP enters in the e-mail body (i.e., the main text) a script language program that enables the user 1 to return an automatic reply with information that specifies the job, such as the job ID, upon checking of the image data. The MFP also temporarily stores the transmission contents and the image data in its internal RAM, and puts the job on hold.

(2) The user 1 checks the received image data (operation (2)).

(3) If the quality of the image data is acceptable, the user 1 sends to the MFP a reply to the e-mail via the script program (operation (3)). The script program includes a message that indicates to the MFP that the reply pertains to the acceptability of the image data.

(4) The MFP obtains such information as the job ID from the received reply e-mail, and re-opens the job (operation (4)).

(5) The MFP starts data transmission to the user 2's PC 300b using the transmission contents and image data stored in the internal RAM and specified by the job ID via the designated transmission means (e-mail, FTP or SMB) (operation (5)).

This embodiment can also provide a system by which image data can be checked using any user PC that is located away from the MFP, and the image data can be sent to the intended recipient from the MFP through simple operations from the user PC, as described above.

Third Embodiment

Because the construction of the image transmission system pertaining to a third embodiment of the present invention is identical to that of the first embodiment, explanation thereof will not be repeated herein.

The operations performed by the MFP 100 and the PCs 300a and 300b of this embodiment will be described with reference to FIG. 4.

(1) The MFP attaches the electronic data to an e-mail and sends such e-mail to the user 1 (operation (1) in FIG. 4). When this is done, the e-mail is sent with an MDN (message deposition notification). The MFP also temporarily stores the transmission contents and the electronic data in its internal RAM, and puts the job on hold.

(2) The user 1 checks the image data received (operation (2) in FIG. 4).

(3) If the image data is acceptable, the user 1 sends an MDN reply to the MFP (operation (3) in FIG. 4).

(4) The MFP specifies the user 1 from the 'From' address of the received MDN reply, and re-opens the job (operation (4) in FIG. 4).

(5) The MFP specifies the ID for the job put on hold by the user 1 and starts data transmission to the user 2 using the transmission contents and electronic data stored in the internal RAM via the transmission means (e-mail, FTP or SMB).

Figure 8:
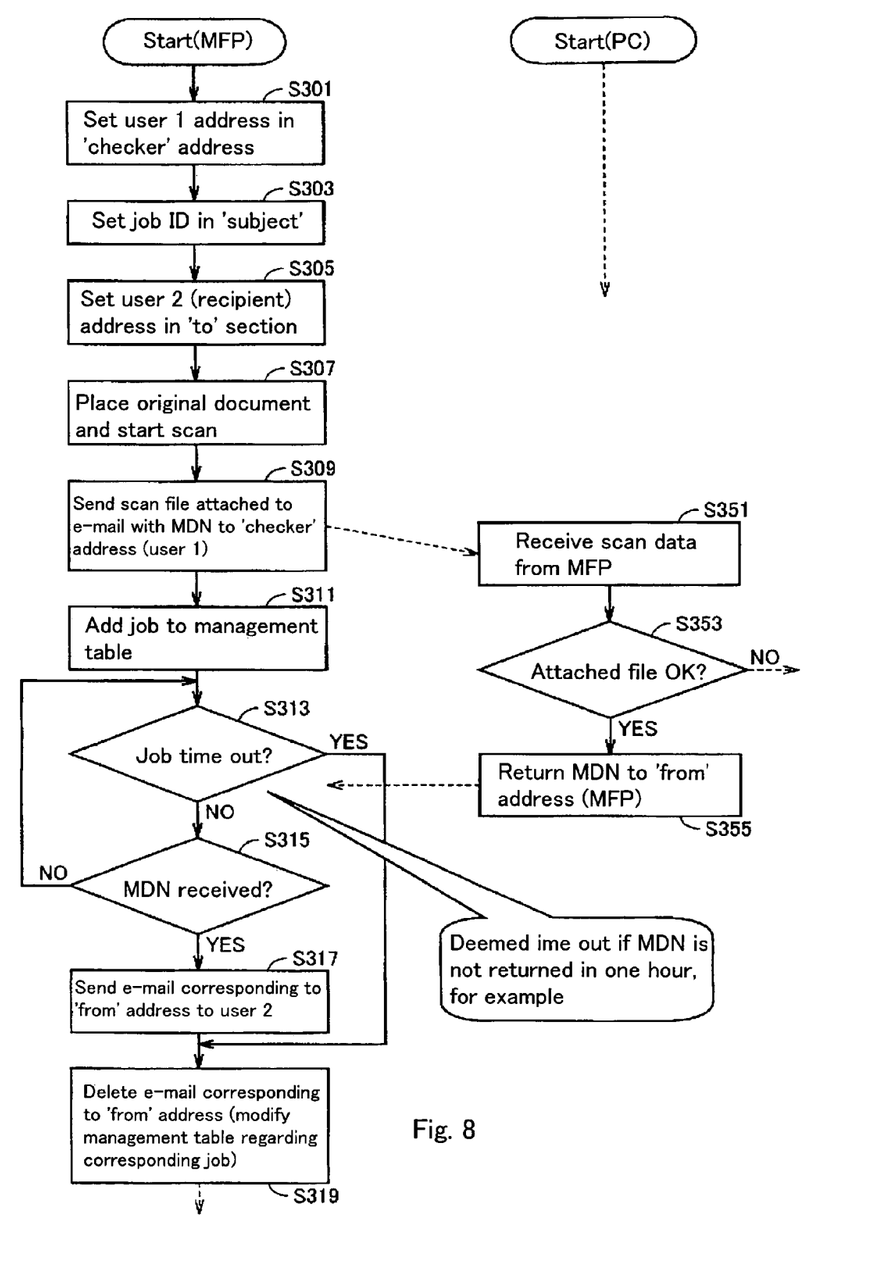
FIG. 8 is a flow chart showing the operations performed by the MFP 100 and the PC 300a in a third embodiment.

FIG. 8 is a flow chart showing the operations performed by the MFP 100 and the PC 300a in this embodiment.

In step S301, the user 1 enters as the checker address the address of his PC 300a via the operation panel of the MFP.

In step S303, the job ID is entered in the 'Subject' section of the e-mail.

In step S305, the user 1 enters the address of the user 2's PC 300b, i.e., the intended recipient, in the 'To' section of the e-mail.

The original document is placed in the MFP 100 and scanning is begun in step S307. In step S309, the e-mail to which the scan file is attached is sent to the checker address (i.e., the user 1's PC 300a address) with an MDN.

In step S311, the read original document data is added to the management table (see FIG. 7) as a job.

When the PC 300a receives the e-mail to which the scan data is attached in step S351 following the transmission thereof in step S309, the user 1 checks the attached file and determines whether the data is acceptable in step S353. If the data is not acceptable, no MDN reply is returned.

On the other hand, if the attached file is acceptable (YES in S353), the PC 300a proceeds to step S355, and an MDN reply is returned to the 'From' address (i.e., the MFP address).

In step S313, the MFP determines whether a prescribed period of time has elapsed (time out) since the transmission of the e-mail to the checker address, and if the answer in step S313 is NO, it is determined in step S315 whether an MDN reply was received (if NO, step S313 is repeated).

In step S315, if an MFP reply was received by the MDN, the corresponding job is determined in step S317 based on the 'From' address in the MDN reply, and an e-mail to which the file corresponding to such job is attached is sent to the user 2's PC 300b address. In step S319, the file and e-mails associated with the job are deleted, and the corresponding job information in the management table is modified.

If a time out is determined in step S313 (i.e., if the MDN is not returned within one hour after transmission, for example), the CPU of the MFP proceeds to step S319.

Other Embodiments

The first and second embodiments may also have a construction wherein the job electronic data stored in the RAM or the like is deleted by the MFP when a prescribed period of time has elapsed.

In addition, the MFP may be constructed such that the job electronic data stored in the RAM or the like is deleted based on user instruction.

Furthermore, the history of transmission to the user 2 may be retained in the form of a table.

Figure 9:
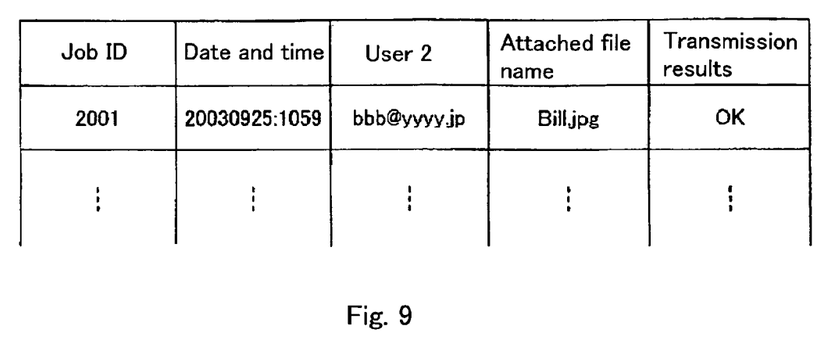
FIG. 9 shows a table that records the history of transmission to a user 2.

FIG. 9 shows a table recording the history of transmission to the user 2.

With reference to the drawing, recorded in this table are the date and time of transmission to the user 2, the user 2 address, the attached file name and the transmission result for each job ID.

The history of transmission to the user 1 (check history) may also be recorded while being linked to the history of transmission of attached files to the user 2. In other words, a table row recording the date and time of transmission (check) to the user 1, the user 1 address, the attached file name and the transmission result (as well as the determination regarding the acceptability of the attached file data) is created for each job ID in the same manner as FIG. 9, and is linked to the user 2 transmission history table based on the job ID or the like.

In this way, because history management can be carried out while the user 1 and the user 2 are linked with each other based on the job ID, verification of the person who checked a file sent to the user 2 can be performed.

It is also acceptable if the history of transmission results and checks is attached to the management table shown in FIG. 7 and retained as part of the history information.

In the first embodiment described above, the job ID was entered in the 'Subject' section of the e-mail, but the implementation of the present invention is not limited thereto, and a job may be specified by entering the job ID in the header or body of the e-mail instead.

It is also acceptable if the user is specified based on not the job ID but on the 'From' address of the reply e-mail, and a job is specified based thereon in the first embodiment as well.

In the embodiments described above, the person who carried out scanning of the original document was the checker of the image data, but it is also acceptable if the scan file is sent to another party who then checks the image data.

Transmission to the user 2 can be realized not only through e-mail, but also through the specification of an IP address, by specifying a folder and moving the scan file thereto, or by using a dedicated communication software program. It is also acceptable if the transmission method is selected by the user.

Transmission to the user 1 for the purpose of checking may also be effected not only via e-mail, but also using any of the other methods referred to above with regard to transmission to the user 2.

A program that executes the operations shown in the flow charts for the embodiments described above may be provided, and such program may be provided to the user as recorded on a recording medium such as a CD-ROM, flexible disk, hard disk, ROM, RAM or memory card. The program may also be downloaded via a communication circuit such as the Internet.

An MFP was used as an example of the image transmission apparatus in the embodiments described above, but the image transmission apparatus of the present invention may comprise another apparatus that is not an MFP. For example, the image transmission apparatus may comprise a scanner having a network function.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image transmission apparatus comprising:
    an address accepting unit for accepting input of a first address and a second address;
    a reader for reading an original document to obtain data pertaining thereto;
    a transmission unit for sending original document data obtained by the reader to the first address;
    a receiving unit for receiving a reply from the first address responding to the transmission by the transmission unit; and
    the transmission unit for further automatically sending the original document data to the second address when the receiving unit receives from the first address a reply indicating acceptability of the original document data.

2. An image transmission apparatus according to claim 1, wherein the transmission unit performs transmission to the first address after assigning identification information by which to specify the original document data, the receiving unit receives a reply that includes the identification information, and the transmission unit specifies the original document data based on the received identification information and performs transmission to the second address.

3. An image transmission apparatus according to claim 1, wherein the transmission unit sends the original document data via e-mail and the receiving unit receives the reply from the first address in the form of e-mail.

4. An image transmission apparatus according to claim 1, wherein the transmission unit performs MDN transmission and the receiving unit receives an MDN reply.

5. An image transmission apparatus according to claim 1, wherein the transmission unit sends e-mail including a script language description.

6. An image transmission apparatus according to claim 1, wherein, when the receiving unit receives a reply from the first address indicating unacceptability of the original document data, the transmission unit does not send the original document data to the second address.

7. An image transmission apparatus according to claim 1, further comprising a storage unit for linking and storing history of transmission by the transmission unit to the first address and history of transmission by the transmission unit to the second address.

8. An image transmission method to be performed with an image transmission apparatus, the image transmission method comprising the steps of:
    1) accepting input of a first address and a second address;
    2) obtaining original document data by reading an original document by a reader;
    3) sending the original document data obtained by the reader to the first address;
    4) receiving a reply from the first address responding to the transmission at step 3; and
    5) sending the original document data to the second address automatically when a reply from the first address indicating acceptability of the original document data is received at step 4.

9. An image transmission method according to claim 8, wherein transmission is performed at step 3 after assigning identification information by which to specify the original document data, a reply that includes the identification information is received at step 4, and the original document data is specified based on the received identification information and is sent at step 5.

10. An image transmission method according to claim 8, wherein the original document data is sent via e-mail at step 3 and the reply from the first address is received in the form of e-mail at step 4.

11. An image transmission method according to claim 8, wherein MDN transmission is performed at step 3 and an MDN reply is received at step 4.

12. An image transmission method according to claim 8, wherein e-mail including a script language description is sent at step 3.

13. An image transmission method according to claim 8, wherein, when a reply from the first address indicating unacceptability of the original document data is received at step 4, the original document data is not sent at step 5.

14. An image transmission method according to claim 8, further comprising a step of linking and storing history of transmission at step 3 and history of transmission at step 5.

15. A non-transitory computer readable medium storing a program causing a computer to execute image transmission processing comprising the steps of:

1) accepting input of a first address and a second address;
2) obtaining original document data by reading an original document by a reader;
3) sending the original document data obtained by the reader to the first address;
4) receiving a reply from the first address responding to the transmission at step 3; and
5) sending the original document data to the second address automatically when a reply from the first address indicating acceptability of the original document data is received at step 4.

\* \* \* \* \*